US009240199B2

(12) United States Patent
Song

(10) Patent No.: US 9,240,199 B2
(45) Date of Patent: Jan. 19, 2016

(54) SYSTEMS AND METHODS FOR DISTORTION CHARACTERIZATION

(71) Applicant: LSI Corporation, San Jose, CA (US)

(72) Inventor: Xiufeng Song, San Jose, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/217,886

(22) Filed: Mar. 18, 2014

(65) Prior Publication Data

US 2015/0262592 A1    Sep. 17, 2015

Related U.S. Application Data

(60) Provisional application No. 61/951,637, filed on Mar. 12, 2014.

(51) Int. Cl.
| G11B 5/09 | (2006.01) |
| G11B 20/18 | (2006.01) |
| G11B 20/10 | (2006.01) |
| G11B 27/36 | (2006.01) |

(52) U.S. Cl.
CPC ............ *G11B 5/09* (2013.01); *G11B 20/10009* (2013.01); *G11B 20/10046* (2013.01); *G11B 20/1876* (2013.01); *G11B 27/36* (2013.01)

(58) Field of Classification Search
None
See application file for complete search history.

(56) References Cited

U.S. PATENT DOCUMENTS

| 4,096,562 A * | 6/1978 | Linz ...................... G05B 11/42 318/632 |
| 5,739,972 A * | 4/1998 | Smith ...................... G01N 25/72 360/77.03 |
| 5,818,656 A * | 10/1998 | Klaassen ................ G11B 5/012 360/55 |
| 5,834,976 A * | 11/1998 | Tomasini et al. ............. 330/292 |
| 6,377,116 B1 * | 4/2002 | Mattsson et al. ................... 330/2 |
| 6,424,480 B1 * | 7/2002 | Bhandari .......... G11B 20/10009 327/551 |
| 6,515,819 B1 * | 2/2003 | Schmidt ............. G11B 5/59616 360/78.04 |
| 7,023,271 B1 * | 4/2006 | Aram ........................ H03F 1/34 330/69 |
| 7,564,644 B2 * | 7/2009 | Kim ................... G11B 5/59627 360/78.14 |
| 7,729,071 B2 | 6/2010 | Harada |
| 7,733,592 B2 | 6/2010 | Hutchins et al. |
| 7,982,991 B2 * | 7/2011 | Noda et al. ...................... 360/46 |
| 7,982,994 B1 | 7/2011 | Erden et al. |
| 8,250,434 B2 | 8/2012 | Yang |
| 8,537,482 B1 * | 9/2013 | Song ........................ G11B 5/09 360/39 |
| 8,618,961 B1 * | 12/2013 | Massie ............... H03H 17/0202 341/60 |
| 8,638,513 B1 | 1/2014 | Burd |
| 2005/0190475 A1 * | 9/2005 | Poss ........................ G05F 1/575 360/46 |
| 2006/0023342 A1 * | 2/2006 | Kisaka ............... G11B 5/59627 360/77.04 |

(Continued)

OTHER PUBLICATIONS

Gibson et al "Directions for Shingled-Write and Two-Dimensional Magnetic Recording System" Architectures: Synergies with Solid-State Disks Carnegie Mellon Univ. May 1, 2009.

(Continued)

*Primary Examiner* — Dismery Mercedes

(57) ABSTRACT

Systems, methods, devices and circuits for data amplification, and more particularly systems and methods for characterizing distortion introduced during data amplification. In some cases, an amplifier modeling circuit is discussed that receives a preamplifier status input from a preamplifier circuit; applies a vector fitting algorithm to the preamplifier status to yield a pole value; determines that the pole value is greater than unity; and replaces the pole value with an inverse of the pole value when the pole value is greater than unity.

20 Claims, 6 Drawing Sheets

(56) References Cited

U.S. PATENT DOCUMENTS

| | | |
|---|---|---|
| 2008/0151704 A1 | 6/2008 | Harada |
| 2008/0258828 A1* | 10/2008 | Sutardja ............... H03B 5/1228 331/117 R |
| 2009/0135693 A1 | 5/2009 | Kim |
| 2011/0041028 A1 | 2/2011 | Liu et al. |
| 2011/0103527 A1 | 5/2011 | Liu et al. |
| 2011/0164332 A1* | 7/2011 | Cao ........................ G11B 5/09 360/32 |
| 2012/0053705 A1* | 3/2012 | Bensoussan ............. G05B 5/01 700/37 |
| 2012/0063022 A1 | 3/2012 | Mathew |
| 2012/0063023 A1 | 3/2012 | Mathew |
| 2012/0063024 A1 | 3/2012 | Mathew |
| 2012/0063284 A1 | 3/2012 | Mathew et al. |
| 2013/0021689 A1 | 1/2013 | Haratsch |
| 2013/0083418 A1 | 4/2013 | Worrell et al. |
| 2013/0285743 A1* | 10/2013 | Onishi ........................ 330/149 |
| 2013/0286498 A1 | 10/2013 | Haratsch et al. |
| 2014/0333380 A1* | 11/2014 | Tan ..................... H03F 3/45183 330/253 |

OTHER PUBLICATIONS

U.S. Appl. No. 14/148,407, filed Jan. 6, 2014, Lu Lu, Unpublished.

U.S. Appl. No. 14/109,804, filed Dec. 17, 2013, Haitao Xia, Unpublished.

U.S. Appl. No. 13/705,116, filed Dec. 4, 2012, George Mathew, Unpublished.

U.S. Appl. No. 13/912,063, filed Jun. 6, 2013, Fan Zhang, Unpublished.

U.S. Appl. No. 13/784,448, filed Mar. 4, 2013, Jun Xiao, Unpublished.

U.S. Appl. No. 13/618,317, filed Sep. 14, 2012, Jun Xiao, Unpublished.

Wu, et al., "Equation Based LDPC Decoder for Intersymbol Interference Channels" 2005 IEEE International Conf. on Acoustics, Speech, and Signal Processing vol. 5 Mar. 2005.

* cited by examiner

SYSTEMS AND METHODS FOR DISTORTION CHARACTERIZATION

CROSS REFERENCE TO RELATED APPLICATIONS

The present application claims priority to (is a non-provisional of) U.S. Pat. App. No. 61/951,637 entitled "Systems and Methods for Distortion Characterization", and filed Mar. 12, 2014 by Song. The entirety of the aforementioned provisional patent application is incorporated herein by reference for all purposes.

FIELD OF THE INVENTION

Systems, methods, devices and circuits for data amplification, and more particularly systems and methods for characterizing distortion introduced during data amplification.

BACKGROUND

Data processing circuits often include a preamplifier circuit that is operable to amplify a data input to yield an amplified output which is ultimately processed. Such amplification can result in a non-linear distortion in the amplified output. The distortion can reduce the performance of the data processing circuit.

Hence, for at least the aforementioned reasons, there exists a need in the art for advanced systems and methods for characterizing and/or mitigating amplifier distortion in a data processing circuit.

SUMMARY

Systems, methods, devices, circuits for data amplification, and more particularly systems and methods for characterizing distortion introduced during data amplification.

Various embodiments of the present invention provide systems for signal amplification modeling. Such systems include an amplifier modeling system that is operable to: receive a preamplifier status input from a preamplifier circuit; apply a vector fitting algorithm to the preamplifier status to yield a pole value; determine that the pole value is greater than unity; and replace the pole value with an inverse of the pole value.

This summary provides only a general outline of some embodiments of the invention. The phrases "in one embodiment," "according to one embodiment," "in various embodiments", "in one or more embodiments", "in particular embodiments" and the like generally mean the particular feature, structure, or characteristic following the phrase is included in at least one embodiment of the present invention, and may be included in more than one embodiment of the present invention. Importantly, such phases do not necessarily refer to the same embodiment. Many other embodiments of the invention will become more fully apparent from the following detailed description, the appended claims and the accompanying drawings.

BRIEF DESCRIPTION OF THE FIGURES

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF SOME EMBODIMENTS

Figure 1A:
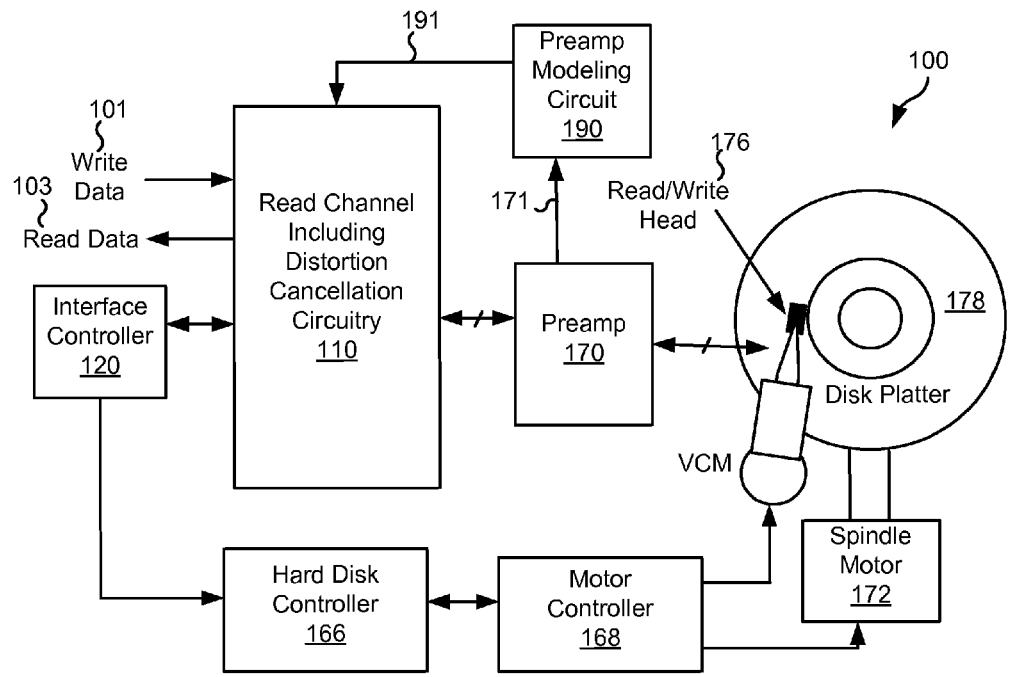
FIG. 1a shows a storage system including a preamplifier modeling circuit operable to model a preamplifier circuit with two or more amplification paths and a read channel circuit having distortion cancellation circuitry in accordance with some embodiments of the present invention.

Systems, methods, devices and circuits for data amplification, and more particularly systems and methods for characterizing distortion introduced during data amplification.

Various embodiments of the present invention provide systems for signal amplification modeling. Such systems include an amplifier modeling system that is operable to: receive a preamplifier status input from a preamplifier circuit; apply a vector fitting algorithm to the preamplifier status to yield a pole value; determine that the pole value is greater than unity; and replace the pole value with an inverse of the pole value.

In some instances of the aforementioned embodiments, amplifier modeling system is implemented as part of an integrated circuit. The integrated circuit may be incorporated in a storage device. Such a storage device includes: a storage medium; a read/write head assembly disposed in relation to the storage medium, and including a first read head and a second read head; and the preamplifier circuit. The preamplifier circuit is operable to: amplify a first signal received from the first read head to yield a first amplified output, and amplify a second signal received from the second read head to yield a second amplified output.

In various instances of the aforementioned embodiments, the system is incorporated in a test system. Such a test system includes: a preamplifier test bench; a memory; the preamplifier circuit providing a preamplifier output to the preamplifier test bench; a preamplifier modeling processor operable to receive the preamplifier status input derived from the preamplifier output. The preamplifier modeling processor is operable to execute non-transient instructions accessed from the memory to: apply the vector fitting algorithm to the preamplifier status to yield the pole value; determine that the pole value is greater than unity; and replace the pole value with the inverse of the pole value.

In one or more instances of the aforementioned embodiments, the preamplifier status input is a frequency value. In some cases, the amplifier modeling system is further operable to convert the frequency value from a frequency domain to a digital domain. In various cases, applying the vector fitting algorithm further yields balance elements. In particular cases, applying the vector fitting algorithm includes: receiving an initial pole value; iteratively calculating the balance elements based upon the initial pole value; and calculating the pole value based upon the balance elements. In one or more cases, iteratively calculating includes applying a least mean squares algorithm to calculate the balance elements. In various cases, the amplifier modeling system is further operable to re-apply the vector fitting algorithm to the preamplifier status using the inverse pole value to yield an updated pole value and updated balance elements. In one particular case, the updated balance elements and the updated pole value are provided to a distortion cancelation circuit.

Other embodiments of the present invention provide methods for circuit modeling. The methods include: amplifying a first input signal using a preamplifier circuit and a second input signal using the preamplifier circuit, wherein the amplification yields a preamplifier status input; applying a vector fitting algorithm to the preamplifier status to yield a pole value; determining that the pole value is greater than unity; and replacing the pole value with an inverse of the pole value.

In some instances of the aforementioned embodiments, the preamplifier status input is a frequency value. In some cases, the methods further include converting the frequency value from a frequency domain to a digital domain. In one or more instances of the aforementioned embodiments, applying the vector fitting algorithm further yields balance elements. In some cases, applying the vector fitting algorithm includes: receiving an initial pole value; iteratively calculating the balance elements based upon the initial pole value; and calculating the pole value based upon the balance elements. In various cases, iteratively calculating includes applying a least mean squares algorithm to calculate the balance elements. In one or more cases, the method further includes re-applying the vector fitting algorithm to the preamplifier status using the inverse pole value to yield an updated pole value and updated balance elements. The updated balance elements and the updated pole value may be provided to a distortion cancelation circuit.

Turning to FIG. 1a, a storage system 100 is shown that includes a preamplifier modeling circuit 190 operable to model a preamplifier circuit 170 with two or more amplification paths and a read channel circuit 110 having distortion cancellation circuitry in accordance with some embodiments of the present invention. Storage system 100 may be, for example, a hard disk drive. Storage system 100 also includes an interface controller 120, a hard disk controller 166, a motor controller 168, a spindle motor 172, a disk platter 178, and a read/write head 176. Read/write head 176 includes two or more read heads that are operable to sense information on disk platter 178 and to provide respective analog signals to preamplifier circuit 170 for amplification. The two or more amplification paths included in preamplifier circuit 170 are each dedicated to an analog signal from a respective read head in read/write head assembly 176. Interface controller 120 controls addressing and timing of data to/from disk platter 178. The data on disk platter 178 consists of groups of magnetic signals that may be detected by read/write head assembly 176 when the assembly is properly positioned over disk platter 178. In one embodiment, disk platter 178 includes magnetic signals recorded in accordance with either a longitudinal or a perpendicular recording scheme.

In a typical read operation, read/write head assembly 176 is accurately positioned by motor controller 168 over one or more data tracks on disk platter 178. As discussed above, read/write head assembly 176 includes two or more read heads capable of sensing data from two or more tracks at the same time, or for sensing multiple instances of the same track. Each of the read heads in read/write head assembly generates an analog signal corresponding to information sensed from disk platter 178. Each of the analog signals are provided to preamplifier circuit 170 where they are individually amplified and provided as respective amplified signals to read channel circuit 110.

Preamplifier modeling circuit 190 receives an input signal and an output signal (both represented by signal path 171) from preamplifier circuit 170. Preamplifier modeling circuit 190 models any distortion between the input signal and the output signal to yield a distortion transfer function represented by adjustable elements of an infinite impulse response filter circuit. The modeled distortion includes two parts: distortion due to nonlinearity and distortion due to cross coupling between the two or more read heads in read/write head assembly.

Figure 1B:
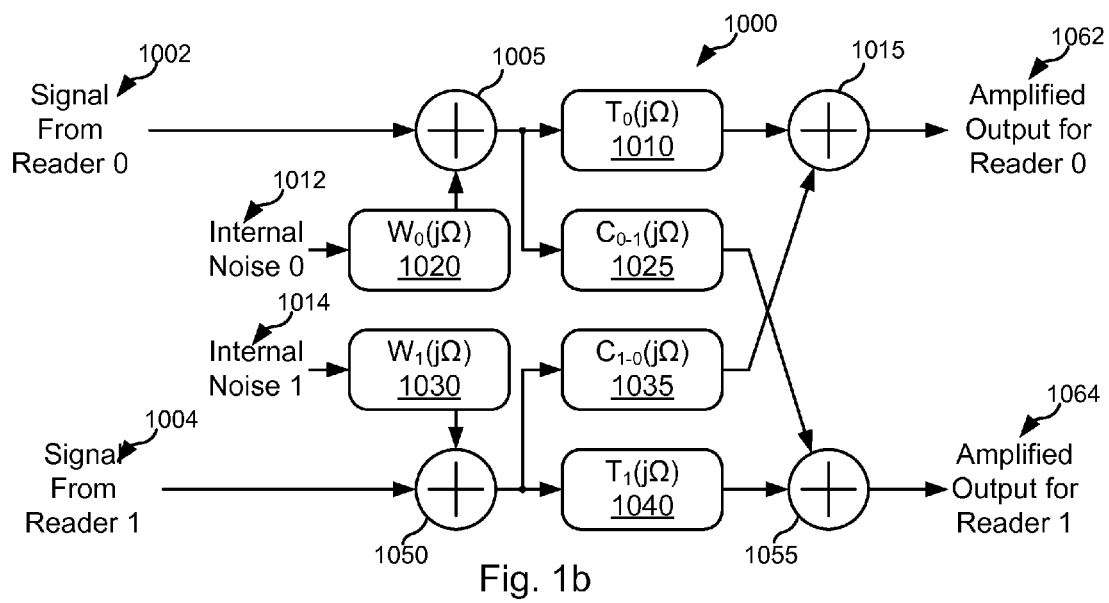
FIG. 1b shows a model of transfer functions included in a preamplifier circuit with two or more amplification paths in accordance with various embodiments of the present invention.

Turning to FIG. 1b, a model 1000 shows the aforementioned non-linear distortion as a noise transfer function ($W_0$ (jΩ)) 1020 and a noise transfer function ($W_1$(jΩ)) 1030, and the cross coupling distortion as a cross transfer function ($C_{1-0}$(jΩ)) 1035 and a cross transfer function ($C_{0-1}$(jΩ)). The non-linear distortion is due to the fact that preamplifier circuit 170 does not provide a flat gain as well as a linear phase. The cross coupling is caused by an inability of preamplifier circuit 170 to completely isolate a first path (signal from reader 0 1002 to amplified output for reader 0 1062) from a second path (signal from reader 1 1004 to amplified output for reader 1 1064). The amplification applied by preamplifier circuit 170 is shown as a through transfer function ($T_0$(jΩ)) 1010 and a through transfer function ($T_1$(jΩ)) 1040.

As shown, model 1000 is for a two input preamplifier circuit where a signal from one reader 1002 is amplified to yield an amplified output 1062 (a first path), and a signal from another reader 1004 is amplified to yield an amplified output 1064 (a second path). As shown, amplification of signal 1002 is represented by through transfer function ($T_0$(jΩ)) 1010, with distortion due to internal noise 1012 represented by noise transfer function ($W_0$(jΩ)) 1020 incorporated by an additive function 1005, and distortion due to cross coupling from the other signal path (i.e., the path amplifying signal 1004) represented by cross transfer function ($C_{1-0}$(jΩ)) 1035 incorporated by an additive function 1015. Similarly, amplification of signal 1004 is represented by through transfer function ($T_1$(jΩ)) 1040, with distortion due to internal noise 1014 represented by noise transfer function ($W_1$(jΩ)) 1030 incorporated by an additive function 1050, and distortion due to cross talk from the other signal path (i.e., the path amplifying signal 1002) represented by cross transfer function ($C_{0-1}$ (jΩ)) 1025 incorporated by an additive function 1055. Where the two paths through preamplifier circuit 170 are the same, it can be reasonably assumed that $T_0$(jΩ) is equal to $T_1$(jΩ), $W_0$(jΩ) is equal to $W_1$(jΩ)), and $C_{1-0}$(jΩ) is equal to $C_{0-1}$(jΩ). In many cases, frequency domain performance measurements reveal that the phase response of preamplifier circuit 170 is nonlinear. In some cases, the gain for noise transfer functions 1020, 1030 is very small relative to the gain of through transfer functions 1010, 1040 and cross transfer functions 1035, 1025.

The adjustable elements generated by preamplifier modeling circuit 190 are provided as an output 191 to read channel circuit 110. The distortion cancellation circuitry of read channel circuit 110 includes an infinite impulse response filter circuit governed by output 191 and operable to cancel the effect of the distortion modeled by preamplifier modeling circuit 190. In some cases, preamplifier modeling circuit 190 may be implemented similar to that discussed below in relation to FIGS. 2-3 and may operate similar to that discussed below in relation to FIGS. 5-6. In addition, read channel circuit 110 includes data processing circuitry operable to recover data originally written to disk platter 178. Such data processing circuitry may include, but is not limited to, a maximum a posteriori data detector circuit and a low density parity check decoder circuit. Based upon the disclosure provided herein, one of ordinary skill in the art will recognize a variety of data processing circuits that may be included as part of read channel circuit 110.

It should be noted that storage system 100 may be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such as storage system 100, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

A data decoder circuit used in relation to read channel circuit 110 may be, but is not limited to, a low density parity check (LDPC) decoder circuit as are known in the art. Such low density parity check technology is applicable to transmission of information over virtually any channel or storage of information on virtually any media. Transmission applications include, but are not limited to, optical fiber, radio frequency channels, wired or wireless local area networks, digital subscriber line technologies, wireless cellular, Ethernet over any medium such as copper or optical fiber, cable channels such as cable television, and Earth-satellite communications. Storage applications include, but are not limited to, hard disk drives, compact disks, digital video disks, magnetic tapes and memory devices such as DRAM, NAND flash, NOR flash, other non-volatile memories and solid state drives.

In addition, it should be noted that storage system 100 may be modified to include solid state memory that is used to store data in addition to the storage offered by disk platter 178. This solid state memory may be used in parallel to disk platter 178 to provide additional storage. In such a case, the solid state memory receives and provides information directly to read channel circuit 110. Alternatively, the solid state memory may be used as a cache where it offers faster access time than that offered by disk platted 178. In such a case, the solid state memory may be disposed between interface controller 120 and read channel circuit 110 where it operates as a pass through to disk platter 178 when requested data is not available in the solid state memory or when the solid state memory does not have sufficient storage to hold a newly written data set. Based upon the disclosure provided herein, one of ordinary skill in the art will recognize a variety of storage systems including both disk platter 178 and a solid state memory.

Figure 2:
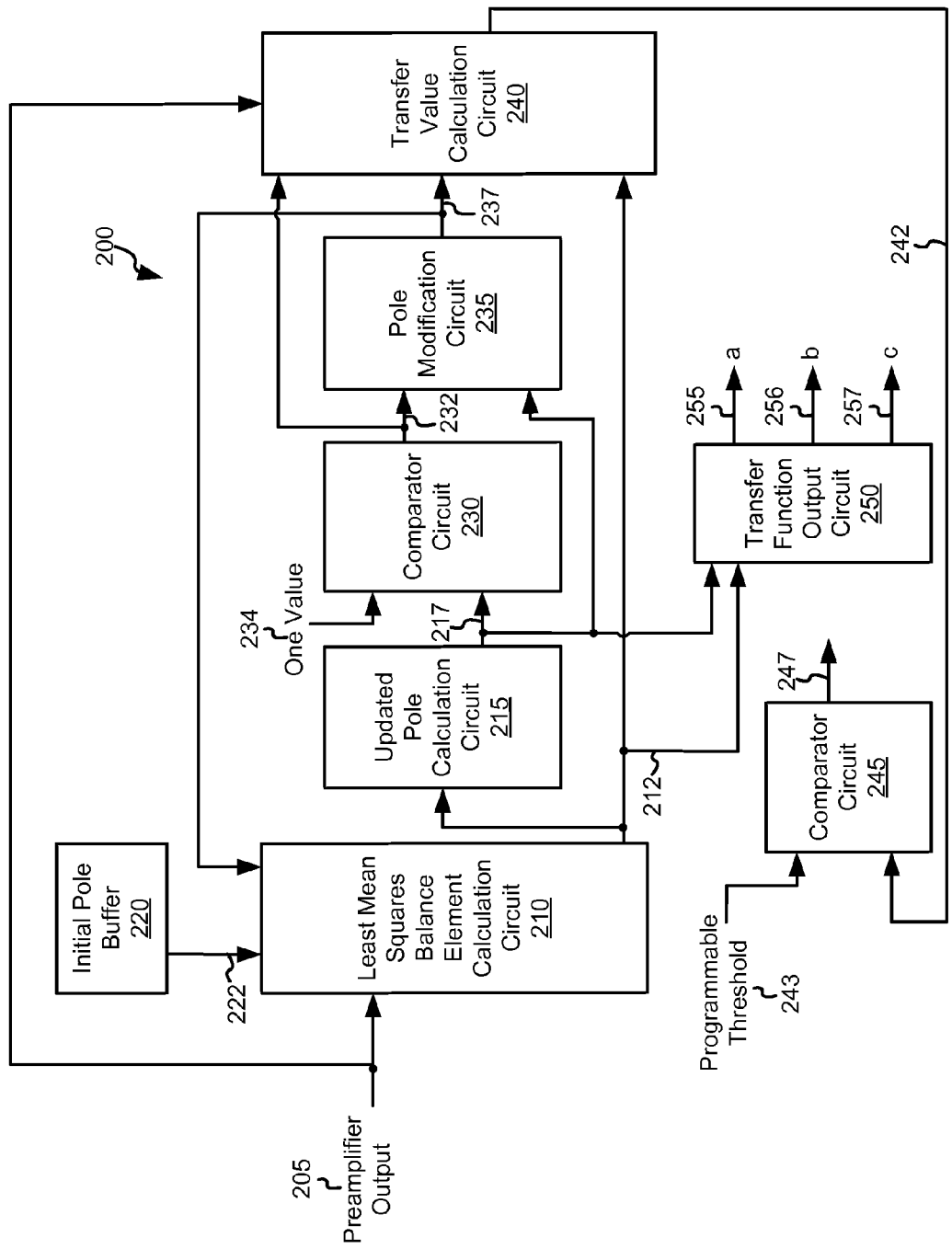
FIG. 2 shows a preamplifier modeling circuit in accordance with various embodiments of the present invention.

Turning to FIG. 2, a preamplifier modeling circuit 200 is depicted in accordance with various embodiments of the present invention. Preamplifier modeling circuit 200 models the operation of an associated preamplifier circuit (not shown) in a digital domain (i.e., Z domain) based upon a preamplifier output 205 that is originally provided in an analog domain (i.e., S domain). Thus, prior to performing the modeling, measured data from the preamplifier circuit is converted from the analog domain to the digital domain to yield preamplifier output 205 in the digital domain. Conversion from the analog domain to the digital domain is done by a conversion circuit operating in accordance with the following equation:

$$z = e^{\left(2\pi j \frac{f_{s-domain}}{f_{sampling}}\right)},$$

where $f_{s\text{-}domain}$ is a frequency response measurement provided from the preamplifier circuit, and $f_{sampling}$ is a sampling frequency used to sample the aforementioned frequency response measurement. The modeling performed by preamplifier modeling circuit 200 results in the generation of filter parameters (a 255, b 256 and c 257) that govern the operation of an adjustable infinite impulse response filter. By converting to the digital domain, vector fitting can be done in the digital domain. This digital domain vector fitting is applied to fit preamplifier output 205 to the following vector:

$$f(z) = \sum_{n=1}^{N} \frac{c_n}{z - a_n} + b,$$

where z is the digital sampling frequency calculated by the conversion process, n indicates a number of instances of the frequency measurement over which the fitting is applied, a corresponds to a pole of the infinite impulse response filter and is ultimately provided as a 255, b 256 and c 257 corresponds to balance elements used as parameters of the infinite impulse response filter and are ultimately provided as b 256 and c 257. Of note, a 255 and c 257 are complex. The vector fitting will force another pole and its numerator to be $a_m = a_n^*$, where $a_n^*$ is the conjugate of $a_n$; $c_m = c_m^*$, where $c_n^*$ is the conjugate of $c_n$.

Preamplifier output 205 is provided to a least mean squares balance element calculation circuit 210 that is operable to calculate values for the balance elements (c and b). Initially, a set of start values 222 for the pole ($a_n$) is accessed from an initial pole buffer 220. Then, a number of instances of the balance elements are (c and b) are estimated using a least mean squares approximation approach as is known in the art. The resulting balance elements (c and b) corresponding to start value 222 for the pole (a) are provided as a balance element output 212.

Balance element output 212 is provided to an updated pole calculation circuit 215 that calculates the pole (a) using the fixed values for the balance elements are (c and b) provided as part of balance element output 212. This value of the pole (a) is provided as an updated pole output 217. Updated pole output 217 is provided to a comparator circuit 230 where it is compared with a one value 234 (i.e., '1' or unity) to yield a comparator output 232.

Comparator output 232 is provided to a pole modification circuit 235. Pole modification circuit 235 is operable to modify pole output 217 to assure stability based upon comparator output 232. In particular, pole modification circuit 217 is operable to replace pole output 217 with its inverse if comparator output 232 indicates that pole output is greater than one. The result of pole modification circuit 235 is provided as a modified pole output 237. The following pseudocode represents the operation of pole modification circuit 235:

---

If(comparator output 232 indicates that pole output 217 is greater than one){ set modified pole output 237 equal to $\dfrac{1}{\text{pole output 217}}$

}
Else {
    set modified pole output 237 equal to pole output 217
}

---

Where pole modified output 237 is the inverted value of pole output 217, the inverted version of pole output 217 is provided back to least mean squares balance element calculation circuit 210 where the balance elements (c and b) are re-estimated for the new pole value, and the results are re-processed as before. Alternatively, where comparator output 232 did not indicate a modification to pole output 217 by pole output modification circuit 235, a transfer value calculation circuit 240 calculates a result for the following transfer function is calculated using modified output 237 (which is the same as pole output 217) and balance element output 212 (c and b):

$$f(z) = \sum_{n=1}^{N} \frac{c_n}{z - a_n} + b.$$

A difference between the calculated result and the actual preamplifier output 205 is calculated by transfer value calculation circuit 240 and provided as an error value 242.

Error value 242 is provided to a comparator circuit 245 where it is compared with programmable threshold 243. Where error value 242 is less than programmable threshold 243, comparator circuit 245 asserts an enable signal 247 to a transfer function output circuit 250. Transfer function output circuit 250 provides pole output 217 as pole value (a) 255, and balance elements output 212 (c 257 and b 256). Pole value (a) 255, and balance elements output 212 (c 257 and b 256) are provided to distortion cancellation circuitry included as part of a read channel circuit. The distortion cancellation circuitry includes a filter that cancels the distortion indicated by pole value (a) 255 and balance elements output 212 (c 257 and b 256).

Figure 3:
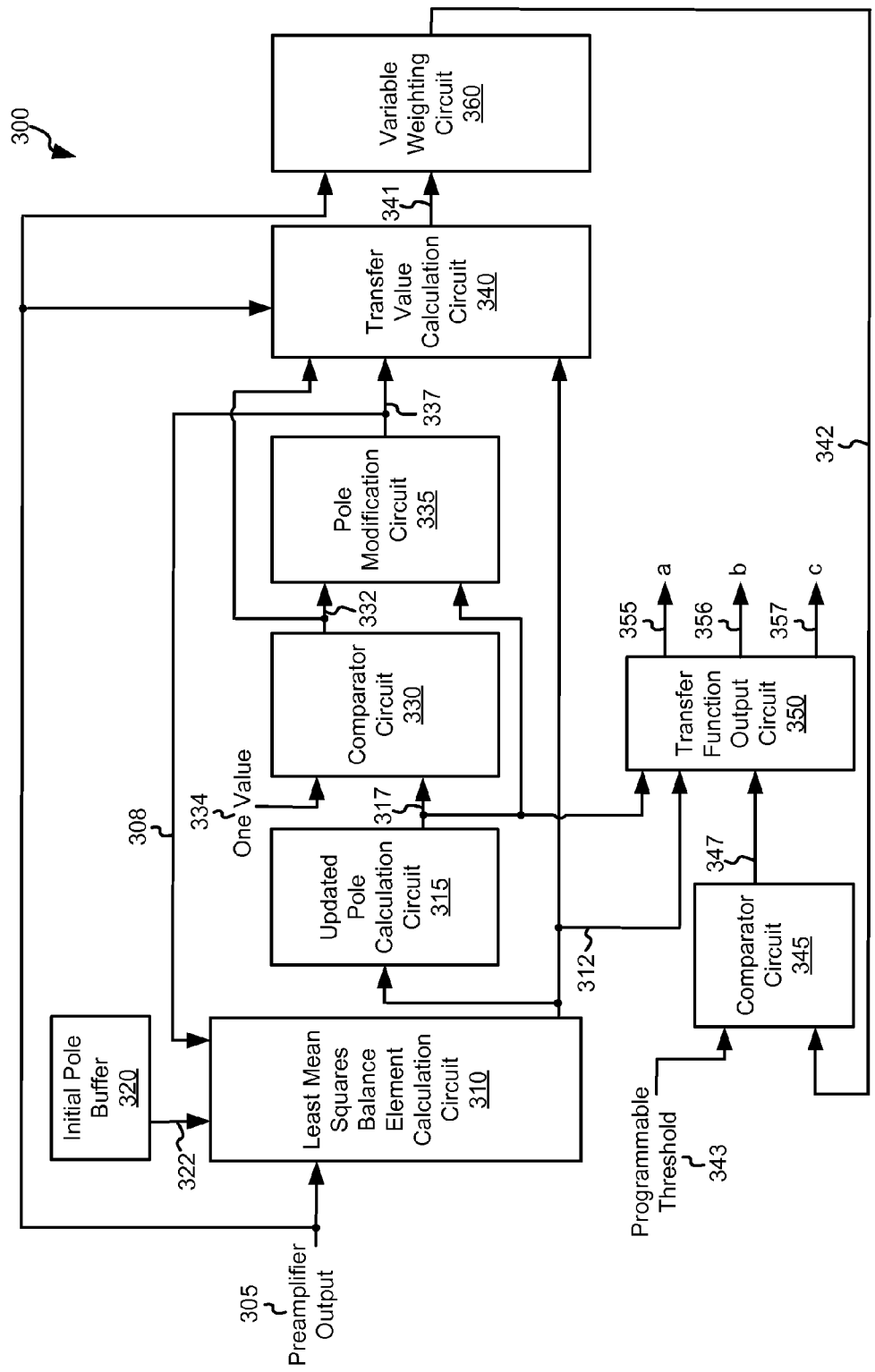
FIG. 3 shows another preamplifier modeling circuit in accordance with other embodiments of the present invention.

Turning to FIG. 3, a preamplifier modeling circuit 300 is depicted in accordance with other embodiments of the present invention. Preamplifier modeling circuit 300 models the operation of an associated preamplifier circuit (not shown) in a digital domain (i.e., Z domain) based upon a preamplifier output 305 that is originally provided in an analog domain (i.e., S domain). Thus, prior to performing the modeling, measured data from the preamplifier circuit is converted from the analog domain to the digital domain to yield preamplifier output 305 in the digital domain. Conversion from the analog domain to the digital domain is done by a conversion circuit operating in accordance with the following equation:

$$z = e^{\left(2\pi j \frac{f_{s\text{-}domain}}{f_{sampling}}\right)},$$

where $f_{s\text{-}domain}$ is a frequency response measurement provided from the preamplifier circuit, and $f_{sampling}$ is a sampling frequency used to sample the aforementioned frequency response measurement. The modeling performed by preamplifier modeling circuit 300 results in the generation of filter parameters (a 355, b 356 and c 357) that govern the operation of an adjustable infinite impulse response filter. By converting to the digital domain, vector fitting can be done in the digital domain. This digital domain vector fitting is applied to fit preamplifier output 305 to the following vector:

$$f(z) = \sum_{n=1}^{N} \frac{c_n}{z - a_n} + b,$$

where z is the digital sampling frequency calculated by the conversion process, n indicates a number of instances of the frequency measurement over which the fitting is applied, a corresponds to a pole of the infinite impulse response filter and is ultimately provided as a 355, b 356 and c 357 corresponds to balance elements used as parameters of the infinite impulse response filter and are ultimately provided as b 356 and c 357. Of note, a 355 and c 357 are complex. The vector fitting will force another pole and its numerator to be $a_m = a_n^*$, where $a_n^*$ is the conjugate of $a_n$; $c_m = c_m^*$, where $c_n^*$ is the conjugate of $c_n$.

Preamplifier output 305 is provided to a least mean squares balance element calculation circuit 310 that is operable to calculate values for the balance elements (c and b). Initially, a set of start values 322 for the pole ($a_n$) is accessed from an initial pole buffer 320. Then, a number of instances of the balance elements are (c and b) are estimated using a least mean squares approximation approach as is known in the art. The resulting balance elements (c and b) corresponding to start value 322 for the pole (a) are provided as a balance element output 312.

Balance element output 312 is provided to an updated pole calculation circuit 315 that calculates the pole (a) using the fixed values for the balance elements are (c and b) provided as part of balance element output 312. This value of the pole (a) is provided as an updated pole output 317. Updated pole output 317 is provided to a comparator circuit 330 where it is compared with a one value 334 (i.e., '1' or unity) to yield a comparator output 332.

Comparator output 332 is provided to a pole modification circuit 335. Pole modification circuit 335 is operable to modify pole output 317 to assure stability based upon comparator output 332. In particular, pole modification circuit 317 is operable to replace pole output 317 with its inverse if comparator output 332 indicates that pole output is greater than one. The result of pole modification circuit 335 is provided as a modified pole output 337. The following pseudocode represents the operation of pole modification circuit 335:

```
If(comparator output 332 indicates that pole output 317 is greater
than one){
    set modified pole output 337 equal to $\frac{1}{\text{pole output 317}}$
}
Else {
    set modified pole output 337 equal to pole output 317
}
```

Where pole modified output 337 is the inverted value of pole output 317, the inverted version of pole output 317 is provided back to least mean squares balance element calculation circuit 310 where the balance elements (c and b) are re-estimated for the new pole value, and the results are re-processed as before. Alternatively, where comparator output 332 did not indicate a modification to pole output 317 by pole output modification circuit 335, a transfer value calculation circuit 340 calculates a result for the following transfer function is calculated using modified output 337 (which is the same as pole output 317) and balance element output 312 (c and b):

$$f(z) = \sum_{n=1}^{N} \frac{c_n}{z - a_n} + b.$$

A difference between the calculated result and the actual preamplifier output 305 is calculated by transfer value calculation circuit 340 and provided as an error value 341.

Error value 341 is provided to a variable weighting circuit 360 that weights error value by a variable weighting factor (w) to yield a weighted output 342 in accordance with the following equation:

weighted output 342=w(error value 341).

Variable weighting factor (w) is selected based upon the frequency of preamplifier circuit 305. In some embodiments of the present invention, the weighting factor is calculated in accordance with the following equation:

w=[frequency of Preamplifier Output 305]$^{-\alpha}$, where $\alpha > 0$. A higher value of $\alpha$ may be selected for lower frequencies of preamplifier output 305, and a lower value of $\alpha$ for higher frequencies. As such, weighted output 342 is weighted differently for different frequencies of preamplifier output 305.

Weighted output 342 is provided to a comparator circuit 345 where it is compared with programmable threshold 343. Where weighted output 341 is less than programmable threshold 343, comparator circuit 345 asserts an enable signal 347 to a transfer function output circuit 350. Transfer function output circuit 350 provides pole output 317 as pole value (a) 355, and balance elements output 312 (c 357 and b 356). Pole value (a) 355, and balance elements output 312 (c 357 and b 356) are provided to distortion cancellation circuitry included as part of a read channel circuit. The distortion cancellation circuitry includes a filter that cancels the distortion indicated by pole value (a) 355 and balance elements output 312 (c 357 and b 356).

Figure 4:
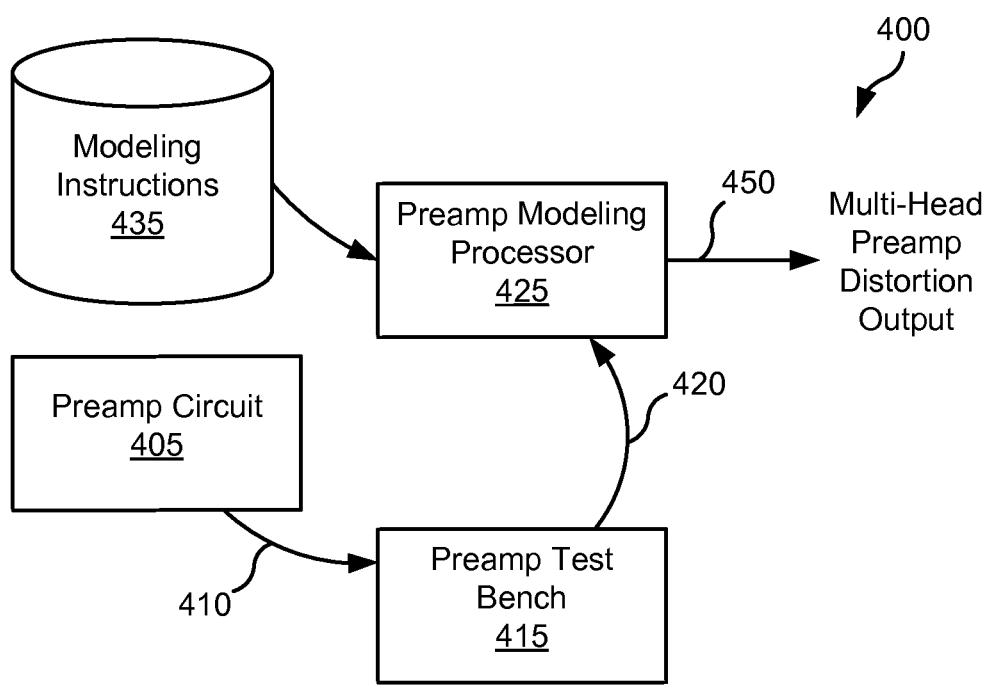
FIG. 4 shows an offline preamplifier characterizing system in accordance with various embodiments of the present invention.

Turning to FIG. 4, an offline preamplifier characterizing system 400 is shown in accordance with various embodiments of the present invention. Offline preamplifier characterizing system 400 includes a preamplifier test bench 415 to which a preamplifier circuit 405 is installed for testing. Preamplifier test bench 415 is operable to provide test signals to exercise preamplifier circuit 405 which results in preamplifier circuit 405 providing frequency output 410 to preamplifier test bench 415. Preamplifier test bench includes a preamplifier modeling processor 425 that receives a frequency input 420 that corresponds to frequency output 410.

A storage medium 435 includes modeling instructions. The preamplifier modeling instructions are accessed from storage medium 435 and executed by preamplifier modeling processor 425. The modeling instructions are executable by processor 425 to perform the processes set forth in one or more of FIG. 5 or FIG. 6 discussed below. Execution of the modeling instructions by executable processor 425 results in filter parameters corresponding to an infinite impulse response filter (i.e., a pole value ($a_n$) and balance elements ($c_n$ and b)) that are used to design a distortion cancelation circuit included as part of a read channel circuit. Such a distortion cancelation circuit includes a filter that cancels the distortion indicated by the pole value ($a_n$) and balance elements ($c_n$ and b) provided as part of a multi-head preamplifier distortion output 450.

Figure 5:
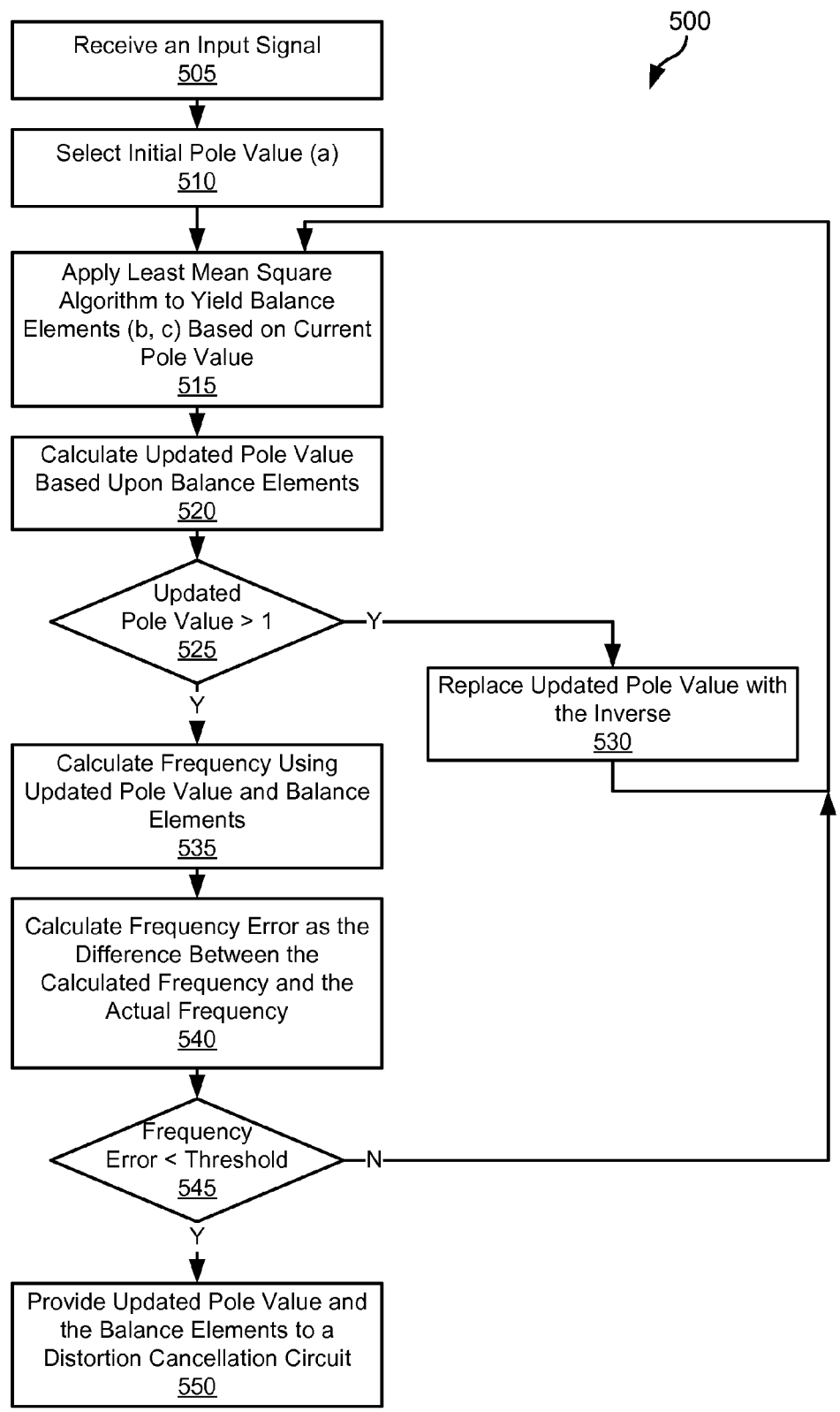
FIG. 5 is a flow diagram showing a method in accordance with some embodiments of the present invention for preamplifier circuit modeling.

Turning to FIG. 5, a flow diagram 500 shows a method in accordance with some embodiments of the present invention for preamplifier circuit modeling. Following flow diagram 500, an input signal is received (block 505). The input signal is in the digital domain, but represents a preamplifier output in the frequency domain. Conversion of the preamplifier output from the analog domain to the digital domain to yield the input signal may be done in accordance with the following equation:

$$z = e^{\left(2\pi j \frac{f_{s\text{-}domain}}{f_{sampling}}\right)},$$

where $f_{s\text{-}domain}$ is a frequency response measurement provided from the preamplifier circuit, and $f_{sampling}$ is a sampling frequency used to sample the aforementioned frequency response measurement. The modeling performed in the process of flow diagram 500 results in the generation of filter parameters (a, b and c) that govern the operation of an adjustable infinite impulse response filter. By converting to the digital domain, vector fitting can be done in the digital domain. This digital domain vector fitting is applied to the received input signal to the following vector:

$$f(z) = \sum_{n=1}^{N} \frac{c_n}{z - a_n} + b,$$

where z is the digital sampling frequency calculated by the conversion process, n indicates a number of instances of the frequency measurement over which the fitting is applied, a corresponds to a pole of the infinite impulse response filter and is ultimately provided as parameters a, b and c corresponds to balance elements used as parameters of the infinite impulse response filter. Of note, parameters a and c are complex. The vector fitting will force another pole and its numerator to be $a_m = a_n^*$, where $a_n^*$ is the conjugate of $a_n$; $c_m = c_m^*$, where $c_n^*$ is the conjugate of $c_n$.

A set of initial pole values (parameter $a_n$) is selected. A least mean squares algorithm is applied to calculate balance elements (i.e., parameters $c_n$ and b) based upon the selected pole values ($a_n$) (block 515). The calculated values for the balance elements are then used to calculate an updated value for the pole ($a_n$) (block 520). It is determined whether the updated pole value is greater than one or unity (block 525). Where the updated pole value ($a_n$) is greater than unity (block 525), it does not result in a stable filter. As such, the updated pole value ($a_n$) is greater than unity (block 525), the updated pole value ($a_n$) is replaced with the inverse of the updated pole value $$\left(\frac{1}{a_n}\right) \text{(block 530)},$$

and the updated pole value is provided back to block 515 where the processes are repeated using the updated pole value.

Otherwise, where the updated pole value is not greater than unity (block 525), a frequency is calculated based upon the calculated balance elements (c and b) and pole value (a) (block 535). The frequency is calculated in accordance with the following equation:

$$f(z) = \sum_{n=1}^{N} \frac{c_n}{z - a_n} + b.$$

A difference between the calculated result and the received input signal is calculated and provided as a frequency error (block 540).

It is determined whether the frequency error is less than a threshold value (block 545). Where the frequency error is not less than the threshold value (block 545) the processes beginning at block 515 are repeated using the current pole value ($a_n$). Otherwise, where the frequency error is less than the threshold value (block 545), the current values of pole value ($a_n$) and balance elements ($c_n$ and b) are provided to a distortion cancelation circuitry included as part of a read channel circuit (block 550). The distortion cancellation circuitry includes a filter that cancels the distortion indicated by pole value ($a_n$) and balance elements ($c_n$ and b).

Figure 6:
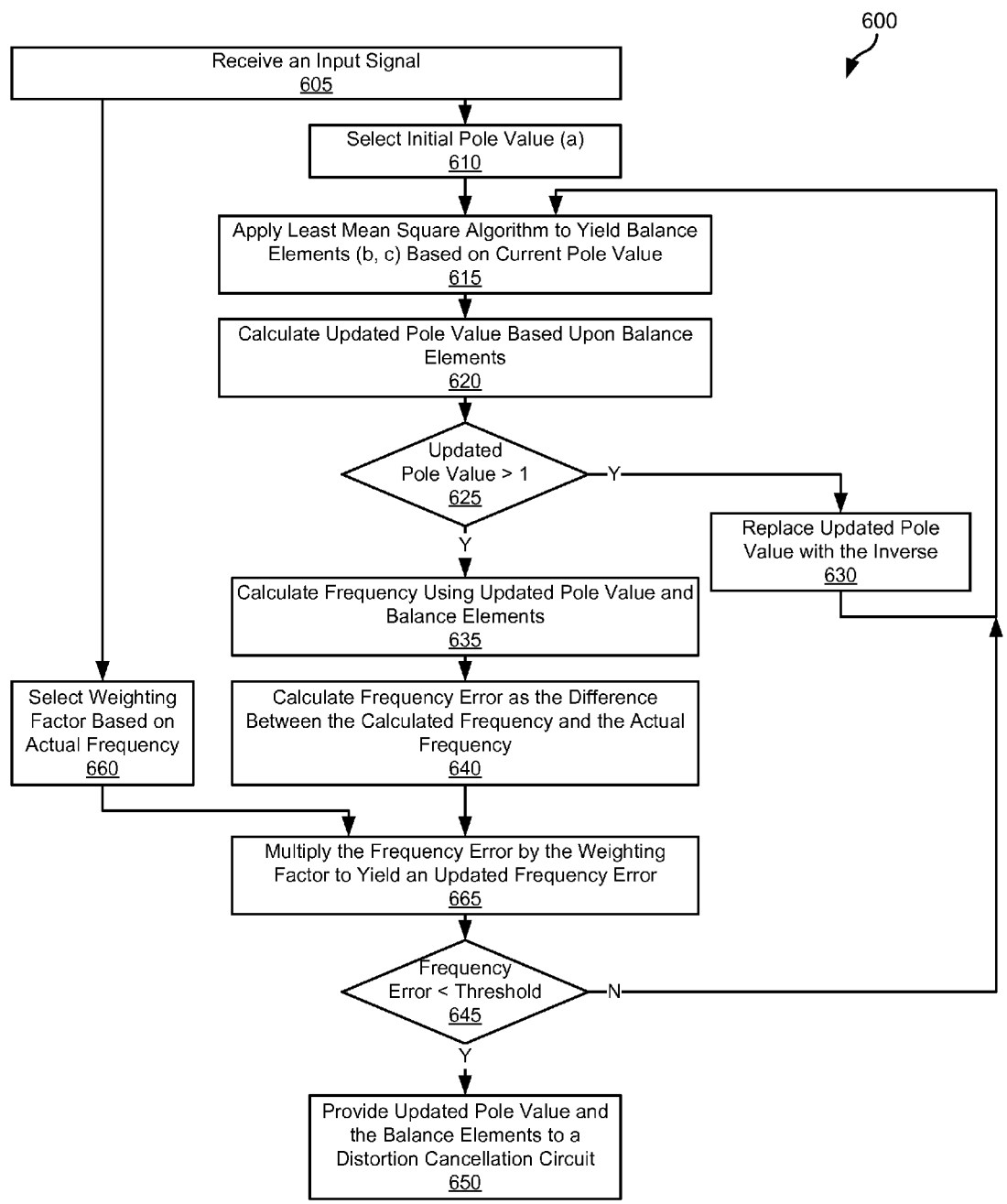
FIG. 6 is a flow diagram showing another method in accordance with other embodiments of the present invention for preamplifier circuit modeling.

Turning to FIG. 6, a flow diagram 600 shows another method in accordance with other embodiments of the present invention for preamplifier circuit modeling. Following flow diagram 600, an input signal is received (block 605). The input signal is in the digital domain, but represents a preamplifier output in the frequency domain. Conversion of the preamplifier output from the analog domain to the digital domain to yield the input signal may be done in accordance with the following equation:

$$z = e^{\left(2\pi j \frac{f_{s-domain}}{f_{sampling}}\right)},$$

where $f_{s-domain}$ is a frequency response measurement provided from the preamplifier circuit, and $f_{sampling}$ is a sampling frequency used to sample the aforementioned frequency response measurement. The modeling performed in the process of flow diagram 600 results in the generation of filter parameters (a, b and c) that govern the operation of an adjustable infinite impulse response filter. By converting to the digital domain, vector fitting can be done in the digital domain. This digital domain vector fitting is applied to the received input signal to the following vector:

$$f(z) = \sum_{n=1}^{N} \frac{c_n}{z - a_n} + b,$$

where z is the digital sampling frequency calculated by the conversion process, n indicates a number of instances of the frequency measurement over which the fitting is applied, a corresponds to a pole of the infinite impulse response filter and is ultimately provided as parameters a, b and c corresponds to balance elements used as parameters of the infinite impulse response filter. Of note, parameters a and c are complex. The vector fitting will force another pole and its numerator to be $a_m = a_n^*$, where $a_n^*$ is the conjugate of $a_n$; $c_m = c_m^*$, where $c_n^*$ is the conjugate of $c_n$.

A set of initial pole values (parameter $a_n$) is selected. A least mean squares algorithm is applied to calculate balance elements (i.e., parameters $c_n$ and b) based upon the selected pole values ($a_n$) (block 615). The calculated values for the balance elements are then used to calculate an updated value for the pole ($a_n$) (block 620). It is determined whether the updated pole value is greater than one or unity (block 625). Where the updated pole value ($a_n$) is greater than unity (block 625), it does not result in a stable filter. As such, the updated pole value ($a_n$) is greater than unity (block 625), the updated pole value ($a_n$) is replaced with the inverse of the updated pole value $$\left(\frac{1}{a_n}\right) \text{(block 630)},$$

and the updated pole value is provided back to block 615 where the processes are repeated using the updated pole value.

Otherwise, where the updated pole value is not greater than unity (block 625), a frequency is calculated based upon the calculated balance elements (c and b) and pole value (a) (block 635). The frequency is calculated in accordance with the following equation:

$$f(z) = \sum_{n=1}^{N} \frac{c_n}{z - a_n} + b.$$

A difference between the calculated result and the received input signal is calculated and provided as a frequency error (block 640).

A weighting factor is selected based upon an actual frequency of the received input signal (block 660). In some embodiments of the present invention, the weighting factor is calculated in accordance with the following equation:

$$w = [\text{frequency of Preamplifier Output 305}]^{-\alpha},$$

where $\alpha > 0$. A higher value of $\alpha$ may be selected for lower frequencies of the input signal received from the preamplifier output, and a lower value of $\alpha$ for higher frequencies. The frequency error is multiplied by the weighting factor (w) to yield an updated frequency error in accordance with the following equation:

updated frequency error=w(frequency error).

(block 665). As such, the updated frequency error is weighted differently for different frequencies of the input signal received from the preamplifier circuit.

It is determined whether the updated frequency error is less than a threshold value (block 645). Where the updated frequency error is not less than the threshold value (block 645) the processes beginning at block 615 are repeated using the current pole value ($a_n$). Otherwise, where the updated frequency error is less than the threshold value (block 645), the current values of pole value ($a_n$) and balance elements ($c_n$ and b) are provided to a distortion cancelation circuitry included as part of a read channel circuit (block 650). The distortion cancellation circuitry includes a filter that cancels the distortion indicated by pole value ($a_n$) and balance elements ($c_n$ and b).

It should be noted that the various blocks discussed in the above application may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the invention provides novel systems, devices, methods and arrangements for out of order data processing. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

The invention claimed is:

1. A system for signal amplification modeling, the system comprising:
   an amplifier modeling circuit operable to:
      receive a preamplifier status input from a preamplifier circuit;
      apply a vector fitting algorithm to the preamplifier status to yield a pole value;
      determine that the pole value is greater than unity; and
      replace the pole value with an inverse of the pole value when the pole value is greater than unity.

2. The system of claim 1, wherein the amplifier modeling circuit is implemented as part of an integrated circuit.

3. The system of claim 2, wherein the integrated circuit is incorporated in a storage device, and wherein the storage device comprises:
   a storage medium;
   a read/write head assembly disposed in relation to the storage medium, and including a first read head and a second read head; and
   the preamplifier circuit, wherein the preamplifier circuit is operable to: amplify a first signal received from the first read head to yield a first amplified output, and amplify a second signal received from the second read head to yield a second amplified output.

4. The system of claim 1, wherein the system is incorporated in a test system, and wherein the test system comprises:
   a preamplifier test bench;
   a memory;
   the preamplifier circuit providing a preamplifier output to the preamplifier test bench;
   a preamplifier modeling processor operable to receive the preamplifier status input, wherein the preamplifier status input is derived from the preamplifier output, and wherein the preamplifier modeling processor is operable to execute non-transient instructions accessed from the memory to:
      apply the vector fitting algorithm to the preamplifier status to yield the pole value;
      determine that the pole value is greater than unity; and
      replace the pole value with the inverse of the pole value.

5. The system of claim 1, wherein the preamplifier status input is a frequency value.

6. The system of claim 5, wherein the amplifier modeling circuit is further operable to:
   convert the frequency value from a frequency domain to a digital domain.

7. The system of claim 1, wherein applying the vector fitting algorithm further yields balance elements.

8. The system of claim 7, wherein applying the vector fitting algorithm includes:
   receiving an initial pole value;
   iteratively calculating the balance elements based upon the initial pole value; and
   calculating the pole value based upon the balance elements.

9. The system of claim 8, wherein iteratively calculating includes applying a least mean squares algorithm to calculate the balance elements.

10. The system of claim 8, wherein the amplifier modeling circuit is further operable to:
    re-apply the vector fitting algorithm to the preamplifier status using the inverse pole value to yield an updated pole value and updated balance elements.

11. The system of claim 10, wherein the updated balance elements and the updated pole value are provided to a distortion cancelation circuit.

12. A method for circuit modeling, the method comprising:
    amplifying a first input signal using a preamplifier circuit and a second input signal using the preamplifier circuit, wherein the amplification yields a preamplifier status input;
    applying a vector fitting algorithm to the preamplifier status to yield a pole value;
    determining that the pole value is greater than unity; and
    replacing the pole value with an inverse of the pole value when the pole value is greater than unity.

13. The method of claim 12, wherein the preamplifier status input is a frequency value.

14. The method of claim 13, wherein the method further comprises:
    converting the frequency value from a frequency domain to a digital domain.

15. The method of claim 12, wherein applying the vector fitting algorithm further yields balance elements.

16. The method of claim 15, wherein applying the vector fitting algorithm includes:
    receiving an initial pole value;
    iteratively calculating the balance elements based upon the initial pole value; and
    calculating the pole value based upon the balance elements.

17. The method of claim 16, wherein iteratively calculating includes applying a least mean squares algorithm to calculate the balance elements.

18. The method of claim 16, wherein the method further comprises:
    re-applying the vector fitting algorithm to the preamplifier status using the inverse pole value to yield an updated pole value and updated balance elements.

19. The method of claim 18, wherein the method further comprises:
    providing the updated balance elements and the updated pole value to a distortion cancelation circuit.

20. A storage device, the device comprising:
    a storage medium;
    a read/write head assembly disposed in relation to the storage medium, and including a first read head and a second read head; and
    the preamplifier circuit, wherein the preamplifier circuit is operable to: amplify a first signal received from the first read head to yield a first amplified output, amplify a second signal received from the second read head to yield a second amplified output, and provide a preamplifier status input; and
    an amplifier modeling system operable to:
        apply a vector fitting algorithm to the preamplifier status to yield a modified pole value and balance elements, and wherein applying the vector fitting algorithm includes:
            receiving an initial pole value;
            iteratively calculating the balance elements based upon the initial pole value; and
            calculating the modified pole value based upon the balance elements;
        determine that the modified pole value is greater than unity;
        replace the modified pole value with an inverse of the pole value.

* * * * *